US005530223A

United States Patent [19]
Culzoni et al.

[11] Patent Number: 5,530,223
[45] Date of Patent: Jun. 25, 1996

[54] CONVECTION AND STEAM OVEN WITH A PRE-ATOMIZER

[75] Inventors: Marco Culzoni, Correggio; William Vezzani, Campagnola, both of Italy

[73] Assignee: Angelo Po Grandi Cucine S.p.A., Carpi, Italy

[21] Appl. No.: 286,749

[22] Filed: Aug. 5, 1994

[30]    Foreign Application Priority Data

| Aug. 5, 1993 | [DE] | Germany | 9311711 U |
| Nov. 5, 1993 | [DE] | Germany | 9316958 U |
| Feb. 17, 1994 | [DE] | Germany | 9402624 U |
| May 18, 1994 | [EP] | European Pat. Off. | 94107706 |

[51] Int. Cl.$^6$ ............................. A21B 3/04; F22B 27/16
[52] U.S. Cl. .................. 219/401; 126/20; 239/461; 239/509
[58] Field of Search ................. 219/400, 401, 219/682; 126/21 A, 20; 239/461, 498, 504, 509

[56]         References Cited

U.S. PATENT DOCUMENTS

| 4,455,924 | 6/1984 | Wenzel | 219/400 |
| 4,556,785 | 12/1985 | Blechschmid et al. | 219/400 |
| 4,671,250 | 6/1987 | Hurley et al. | |
| 4,700,685 | 10/1987 | Miller | 219/401 |
| 4,828,182 | 5/1989 | Haruch | 239/510 |
| 4,844,347 | 7/1989 | Konhäuser et al. | 239/296 |
| 4,932,591 | 6/1990 | Cruz | 239/498 |
| 5,014,679 | 5/1991 | Childs et al. | 126/21 A |
| 5,139,199 | 8/1992 | Jeffrey et al. | 239/509 |
| 5,259,861 | 11/1993 | Yeh et al. | 75/334 |

FOREIGN PATENT DOCUMENTS

| 0233535 | 8/1987 | European Pat. Off. |
| 0244538 | 11/1987 | European Pat. Off. |
| 0457971 | 11/1991 | European Pat. Off. |
| 0523489 | 1/1993 | European Pat. Off. |
| 0530477 | 3/1993 | European Pat. Off. |
| 4131748 | 3/1993 | Germany |
| 40052A/90 | 4/1990 | Italy |

*Primary Examiner*—Philip H. Leung
*Attorney, Agent, or Firm*—Dilworth & Barrese

[57]         ABSTRACT

The invention relates to a convection and steam oven for food with an oven chamber and an auxiliary chamber partitioned-off from this in which are arranged a motor-driven, radial-action fan and several heating elements surrounding the fan, with a pre-atomization element mounted on and rotating with the hub of the fan to which is optionally supplied water from a pipe. In order to maximize pre-atomization efficiency, the pre-atomization element is arranged as a separate body with a convex surface on the hub of the fan.

28 Claims, 15 Drawing Sheets

CONVECTION AND STEAM OVEN WITH A PRE-ATOMIZER

BACKGROUND OF THE INVENTION

The invention relates to a convection and steam oven for food with an oven chamber and an auxiliary chamber partitioned off from this, in which auxiliary chamber a motor-driven radial-action fan is arranged together with several heating elements surrounding the fan, and arranged at the hub of the fan a pre-atomization element rotating with said fan for the atomization of water optionally supplied through a pipe.

Such a convection and steam oven for food is known, for example, from EP 244 538 B 1. In the case where this prior-art oven is operated as a steam oven, a steam atmosphere is formed by virtue of water flowing from the pipe being atomized in two stages and, in this atomized form, being streamed past the heating elements by the radial air flow generated by the fan, causing it to be transformed into the vapour phase. The steam particles are then further entrained by the flow generated by the fan. Final atomization of the water particles still not yet transformed into the vapour phase is performed by the radial action fan. The pre-atomization action according to this prior-art technology is effected by the fact that formed on the rotational axis of the fan is a closed cup element which rotates with the fan. The end of the water supply pipe is located within this cup element. The rotating cup element features a rim portion and an internal surface which extends away from the rim portion in an inverse taper so that a volume of water can collect within the cup, and so that, after the cup has been filled with the water volume, the surplus water flows over the rim so forming a water film which is atomized by the centrifugal force. The water thus pre-atomized then impinges on the ring-arrangement of blades of the radial-action fan where it is further comminuted as explained above.

A convection and steam oven of the same generic species is also known from the Italian utility model 40 052A/90. In contrast to the convection and steam oven described above, in this case an overpressure is built up in the oven chamber so that the steam formed in the auxiliary chamber and distributed around the oven chamber can be superheated. In addition, this increase in pressure in the oven chamber of approx. 5 mbar leads to a more uniform distribution of the steam atmosphere. The pre-atomization element here takes the form of a drum which co-rotates on the shaft of the fan and features, uniformly distributed around its periphery, a number of slot-like oblong holes. The water is supplied from the pipe to the open end of this slotted drum. The water emerging from the pipe is entrained by the air stream sucked from the centre by the radial-action fan, and is guided through the slot-like oblong holes in the drum wall causing the water to be atomized at the slot-like openings. In contrast to the prior-art pre-atomization element according to EP 244 538 B1, here there is not just one water film formed across the rim of a cup. In this latter case, rather, an atomization effect is achieved across the entire length of the oblong holes so that the water droplets thus pre-atomized impinge in an even distribution pattern onto the fan blades. In this case, therefore, better atomization is achieved because, owing to a different pre-atomization principle, the full depth of the radial-action circular fan is utilized.

However, both prior-art constructional forms exhibit the disadvantage that, after a relatively short service time, limescale depositing and clogging occurs, necessitating the need to replace equipment. The limescale becomes deposited predominantly in the outlet area of the pipe, i.e. at the open end of the closed cup or of the slotted drum. Even a modified constructional form which differs from the Italian utility model application, in which the drum exhibits an outwardly extending conical form, provides no remedy to this problem. Depending on the lime content of the water used, the limescale layer which develops may become so thick within a short time that the entire facility is no longer capable of functioning.

A further convection and steam oven of the same generic species is also disclosed in EP 233 535 B. This constructional form features no independently constructed pre-atomization element. In this case, rather, the water is supplied to the hub of the fan. According to the teaching of this patent, the outlet opening of the water supply means is directed radially from the outside onto the hub, and the outlet opening of the water supply means is arranged above the hub. With this arrangement, it is hoped that the water flowing from the outlet opening can fall from above onto the hub rotating with the fan so that it may be atomized by said hub. This prior-art convection and steam oven results in an unsatisfactory pre-atomization effect.

Based on the last-mentioned prior art, the object of the present invention is to further develop a convection and steam oven of the same generic species such that improved pre-atomization of the water to be evaporated is facilitated.

SUMMARY OF THE INVENTION

This object is achieved according to the invention on the basis of the generic species of convection and steam oven as detailed in that the pre-atomization element is arranged as a separate body with a convex surface on the hub of the fan. Accordingly, a pre-atomization element specifically designed for the pre-atomization process is arranged on the hub of the fan. This comprises a body with a convex surface. Surprisingly, it has been found that water droplets impinging on a convex body already undergo very fine pre-atomization as a result of the rotational movement of this body. The decisive factor here is that the limescale deposits forming on the pre-atomization element do not lead to clogging and functional impairment but rather build up on the convex surface leading to additional irregularities at the convex surface which further improve the pre-atomization effect.

According to a preferred embodiment of the invention, the convex body is designed as a sphere. On the surface of the sphere can be arranged a ridge surrounding said sphere which intersects the rotational axis of the sphere at an angle ($\alpha$) which is greater than 0° and smaller than 90°. Through this additional ridge, a particularly good pre-atomization effect is achieved. In particular, distribution of the water droplets throughout the entire depth of the fan ring is ensured by this feature. In a deeper design of the radial-action fan for relatively large ovens, the sphere can be secured via a cylindrical attachment piece to the drive shaft of the fan.

The outlet opening of the pipe supplying the water to be evaporated can, moreover, be arranged adjacent to the sphere as viewed in the direction of the rotational axis, and be directed axially onto the sphere. As a result, the water droplets flowing out of the outlet opening are entrained by the air stream flowing axially into the fan wheel, and directed onto the correspondingly formed pre-atomization element.

As a particularly advantageous feature, the sphere can comprise two semispherical shells, with both semispherical shells being bounded by a circumferential rim. The two semispherical shells can be interconnected along the mating rims such that the materials are integrally joined and/or positively locked. This enables a sphere to be simply and easily obtained which features the surrounding ridge described above. For a more shallow equipment design, the semispherical shells can be provided to advantageous effect with two openings, with one opening fitting a shaft end of the fan rotational shaft, and with a screw fastener being passed through the other opening for securing the sphere. In this constructional design, the need for the cylindrical attachment piece mentioned above is eliminated.

In a further development of the invention, the surface of the sphere can be partially flattened.

In accordance with an alternative embodiment of the invention, the pre-atomization element may also take the form of a semispherical body. Here the lines of symmetry of the semispherical body may, on the one hand, coincide with the rotational axis; the lines of symmetry of the semispherical body may, however, also be arranged at an angle (β) to the rotational axis.

The semispherical body can be manufactured to advantageous effect from a semispherical shell with a surrounding rim and a circular plate which is joined flush to this surrounding rim so as to close and seal the semispherical shell by virtue of uniting the materials of the two elements.

A further independent solution to the problem described at the beginning consists in that a convection and steam oven of the generic species features as the pre-atomization element a preferably circular plate arranged diagonal to the rotational axis of the fan, above which plate the pipe ends. With this embodiment, a uniform distribution of water particles across the depth of the fan ring is achieved, particularly in the case of radial fans of low constructional depth.

In accordance with a preferred embodiment, a rod, a reed or an additional tube may be arranged at the end of the outlet opening of the pipe directed towards the rotational axis of the fan. The rod, reed or the additional tube serve to further guide the droplets as the droplets emerging from the pipe collapse and are guided by the rod, reed or the additional tube towards the pre-atomization element. The free end of the rod, reed or the additional tube extends almost right up to the rotational axis of the fan as a further advantageous feature. According to an advantageous embodiment, the rod, reed or the additional tube may be elastic and possibly consist of rubber. The term reed also covers a channel-like element which may possibly be of elastic construction and/or be suspended as an oscillating element from the pipe. In an alternative embodiment, the rod is of metal.

This special development of the invention introduces a further additional atomization mechanism. Thus the droplets which are guided by the rod, the reed or the tube and which come into contact with the rotating element, have already undergone primary pre-atomization. The rotation of the pre-atomization element results in further atomization.

One end of the sphere can be flattened with the flat facing the outlet opening of the supply pipe. Thus the plane of the outlet opening can be designed so that it is parallel to the plane of the flat. The pipe outlet opening may, however, also be bevelled. According to a further embodiment of the invention, the sphere may feature a recess which is aligned in the direction of the rotational axis towards the interior of the sphere, with the rod extending into said recess. This further improves the transfer of the water droplets being guided to the pre-atomization element.

A special embodiment of the invention consists in that the pipe is brought down to the level of the rotational axis of the fan and that approximately just at the level of the rotational axis of the fan is attached a cup element which is open towards the pre-atomization element. In this case, the axes of symmetry of the pre-atomization element and those of the cup may intersect at an approximate right angle. The pipe and the attached cup are designed such that the water runs through the pipe into the cup which is attached thereto, said cup then directing the water to the immediate vicinity of the pre-atomization element.

The cup may preferably be of rubber or a synthetic material such as Teflon, PTFE. The open rim of the cup may be bevelled and a portion of the rim may be arranged directly adjacent to the pre-atomization element.

Instead of the cup, however, a pipe section open at both ends can be attached to the pipe. This pipe section may feature a funnel-shaped internal wall with the inside diameter increasing towards the pre-atomization element. This ensures that the water entering the open pipe section from the pipe flows towards the pre-atomization element. The open pipe section design has the advantage over the cup closed at one end that air sucked in by the fan flows through the pipe section in the direction of the pre-atomization element.

If the outlet opening of the pipe is arranged adjacent to the sphere in the direction of rotation and is axially directed towards the sphere with said outlet opening of the pipe arranged above the pre-atomization element, a collection trough can be arranged below the outlet opening in the area of the axis of symmetry of the pre-atomization element, the lower rim of said trough ending adjacent to the pre-atomization element. This collection trough may, moreover, be bolted to advantageous effect via a flexible mounting to the pipe.

DESCRIPTION OF THE PREFERRED DRAWINGS

Further features and advantages of the invention will emerge from the description which follows of several embodiments depicted in the drawing, wherein.

DESCRIPTION OF THE PREFERRED EMBODIMENTS

Figure 1:
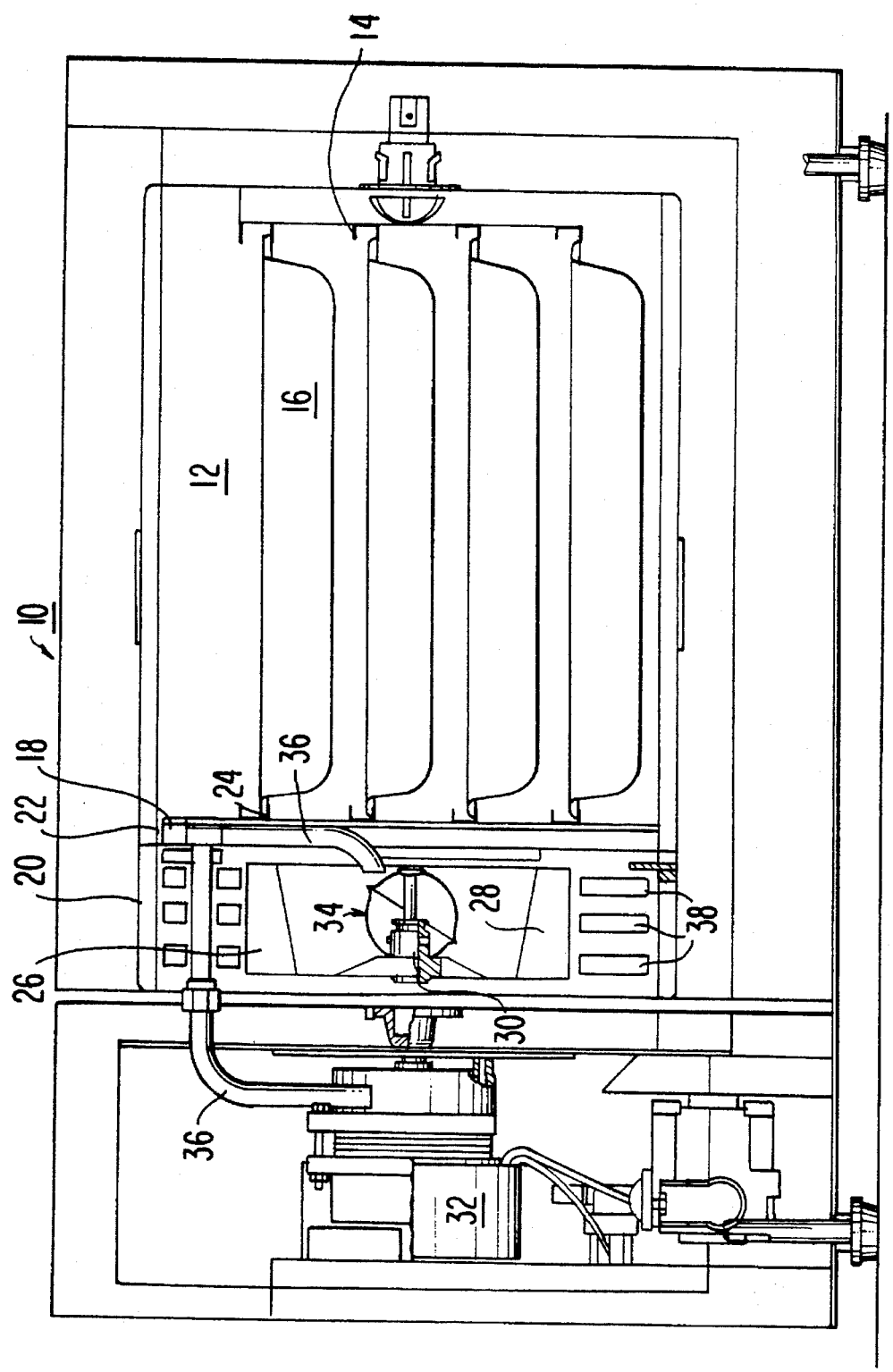
FIG. 1 shows a schematic cross-sectional illustration of a convection and steam oven for food in an embodiment of the invention

The convection and steam oven 10 comprises an oven chamber 12 in which shelves 16 or grids are slid and guided in the conventional manner on sliding rails 14. A partition 18 separates an auxiliary chamber 20 from the oven chamber. This auxiliary chamber 20 is in communication with the oven chamber via peripheral slots 22 and a central opening 24. Arranged in the auxiliary chamber 20 is a radial-action fan 26 which features fan blades 28 arranged around its circumference. The fan 26 is flanged onto a hub 30 which is driven by a motor 32. Also arranged on the fan hub is a pre-atomization element 34 above which ends a pipe 36 in which water to be evaporated is introduced. Arranged around the fan 26 are heating coils 38 which may, for example, be gas-heated or electrically heated. The oven 10 may be operated as a convection oven in which air is streamed over the heating coils 38 by the radial-action fan 26, causing the air to be heated. The heated air passes through the gap 22 running around the partition 18 into the oven chamber 12. In the area of the opening 24, the air is sucked from the oven chamber by the fan 26 and deflected in the direction of the fan blades 28. In the steam oven mode, water is additionally directed from the pipe 36 onto the rotating pre-atomization element 34 where it is dispersed in the form of fine droplets which are distributed across the depth of the fan 26. These pre-atomized droplets are entrained by the air streams deflected towards the fan blades 28, and impinge on the fan blades 28 where they are dispersed a second time and thus finally atomized. The water particles thus finally atomized are streamed past the heating elements 38 where they are transformed into the vapour phase. The steam is uniformly distributed by the air stream around oven chamber 12. The fact that the oven chamber 12 is maintained at a gauge pressure of 3 to 8 mbar is particularly advantageous for steam distribution in the embodiment shown here.

Figure 2:
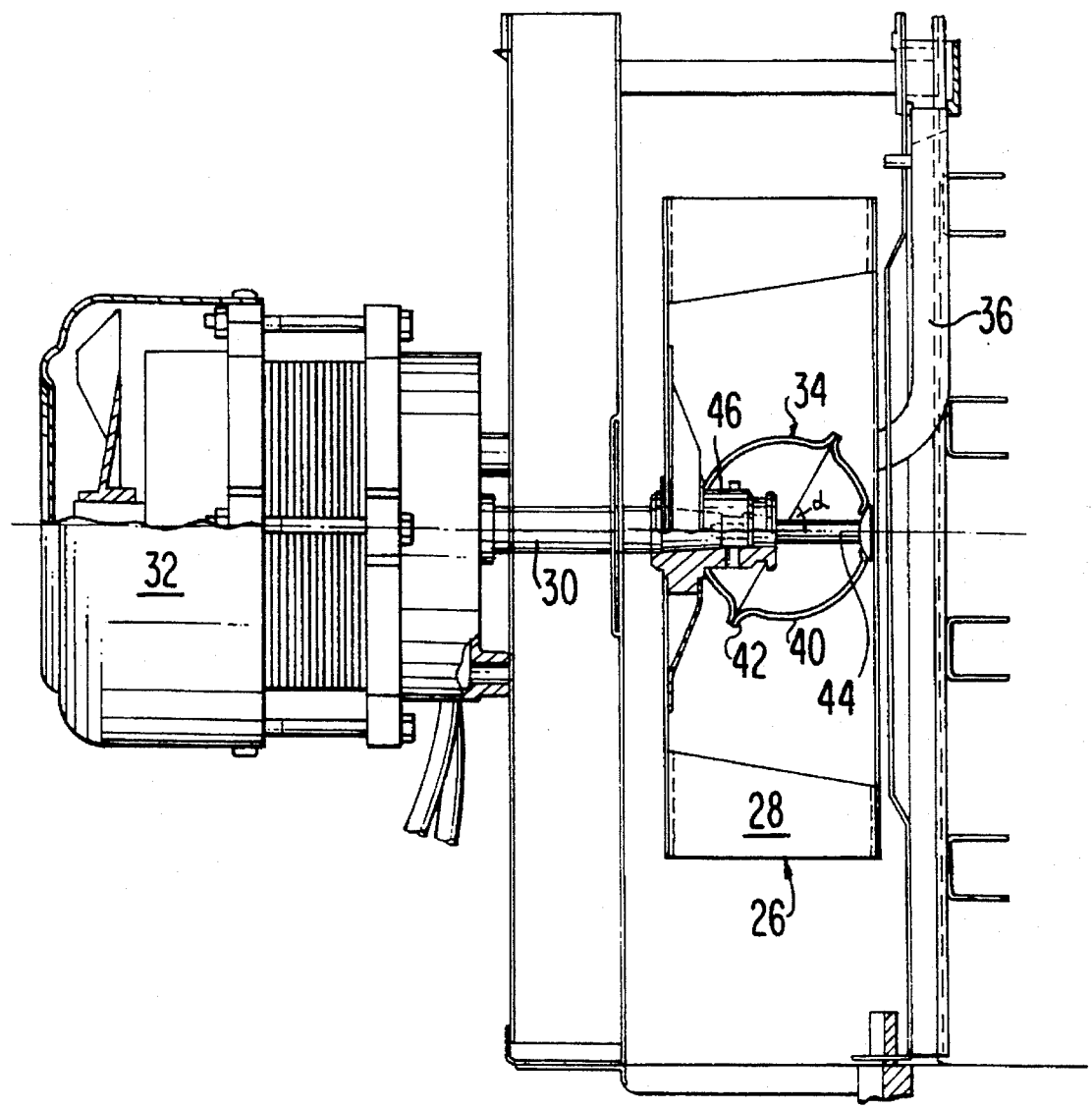
FIG. 2 is an enlarged, detailed view of a portion of the convection and steam oven of the present invention illustrating an alternative embodiment of the pre-atomization element.

FIGS. 2 to 8 show various embodiments for the pre-atomization element. In FIGS. 2 to 8 only the essential details relating to the atomization process are depicted in each case. For reasons of simplification, the heating elements 38 are, for example, no longer shown here. In FIG. 2, a pre-atomization element 34 is mounted on the fan shaft 30 driven by the motor 32, said pre-atomization element 34 comprising two semispherical shells 40 each of which is bounded by a circumferential rim 42. The two semispherical shells are connected by a material-bonding joint along the mating rims 42. Along these integrally joined rims is formed a ridge which encompasses the surface of the sphere, said ridge intersecting the rotational axis of the sphere as indicated in FIG. 2 at an angle which in this embodiment is approx. 60°. The semispherical shells feature two openings with one opening fitting the shaft end of the fan-rotating shaft 30. In the embodiment shown here in FIG. 2, a fixing flange 46 is located on the shaft end for securing the fan 26, to which the opening in the semispherical shell 40 is adapted. A screw fastener 44 is inserted through the other semispherical shell 40 and can be wound into a corresponding tapped hole within the fixing flange 46, so fixing the sphere assembled from the two semispherical shells. Above the rotational axis is the end of the pipe 36 through which the water is supplied to the pre-atomization element 34. In this case, the pipe is arranged parallel to the fan and bent in its end region towards the pre-atomization element 34. Pipe 36 ends approximately in the area of the outside edge of the fan 26 as detailed in FIG. 2. In the embodiment shown in FIG. 2, the pre-atomization element 34 extends across almost the entire depth of the fan 26. This corresponds to an embodiment which is particularly intended for smaller ovens 10. Here the fan 26 and thus also the pre-atomization element 34 rotate at speeds in the region of approx. 2800 revolutions per minute. The overall dimensions of such small ovens are approx. 50 cm deep, 50 cm high and 70 cm wide, these indicating the relevant external dimensions.

Figure 3:
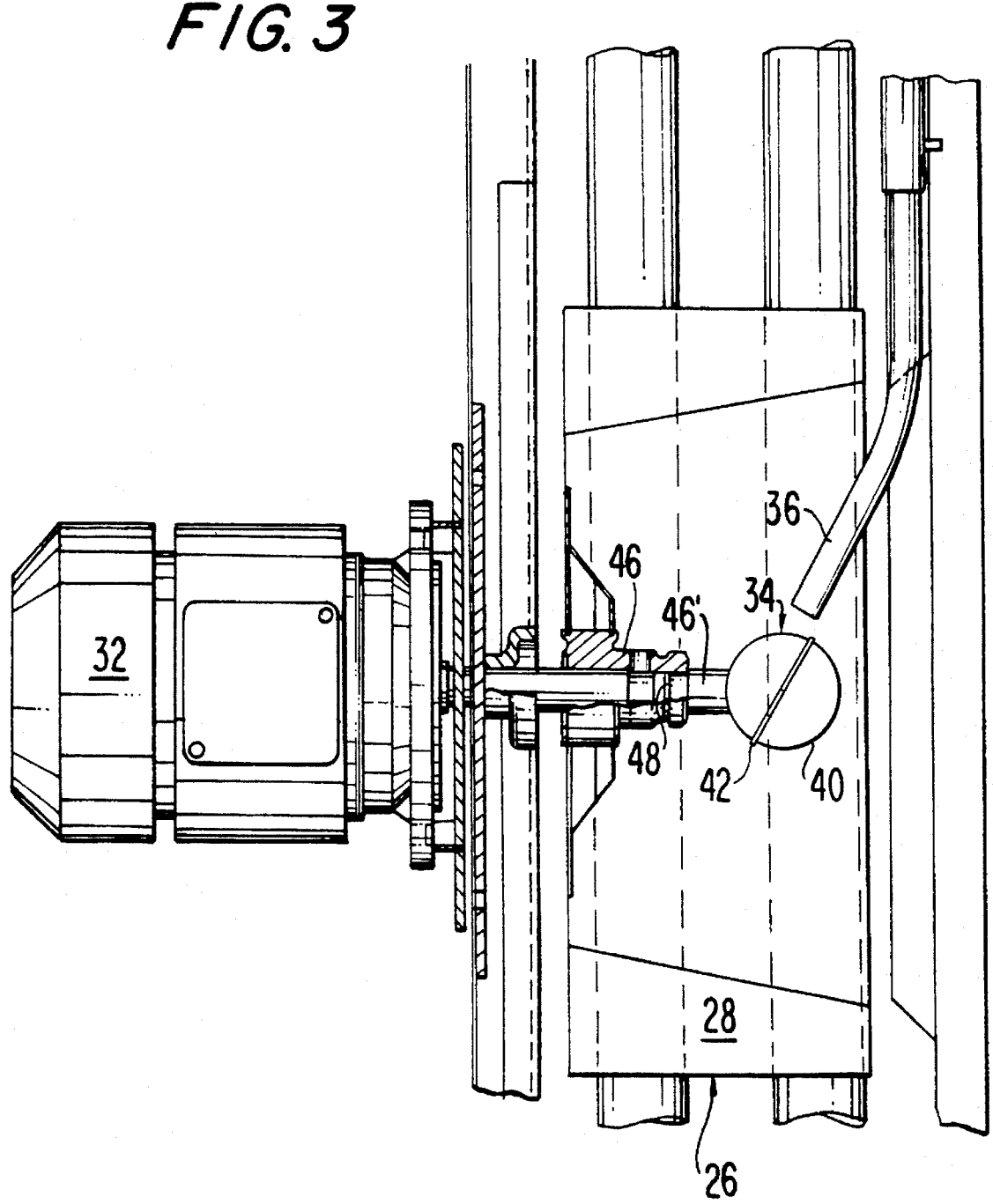
FIG. 3 is an enlarged, detailed view of a portion of the convection and steam oven illustrating another embodiment of the pre-atomization element.

The embodiment according to FIG. 3 essentially corresponds to that of FIG. 2. However, the embodiment here is particularly intended for relatively large ovens. The pre-atomization element here again consists of a sphere which likewise consists of semispherical shells which are joined at an encompassing, protruding ridge 42. Here, however, a cylindrical attachment piece 46' is provided which is aligned to the rotational axis and at one end of which a screw fastener 48 is fitted at which the pre-atomization element 34 is screwed to the fan flange 46. The pipe 36 for supplying the water ends here within the fan 26 above the spherical body as shown in FIG. 3. In this constructional design, the fan 26 operates at speeds ranging from 700 revolutions per minute to 1400 revolutions per minute.

Figure 4:
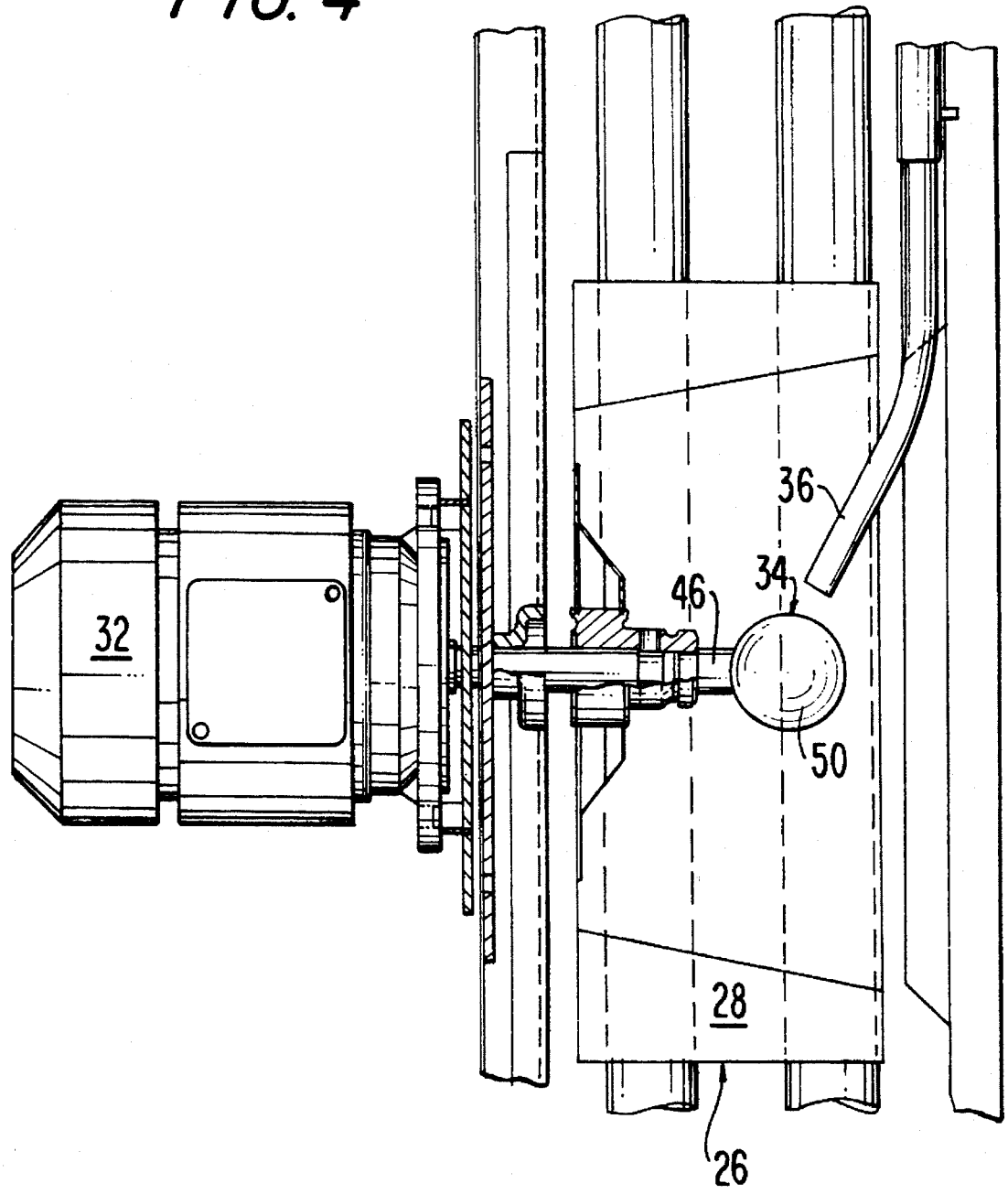
FIG. 4 is an enlarged, detailed view of a portion of the convection and steam oven illustrating a further embodiment of the pre-atomization element.

The alternative embodiment shown in FIG. 4 essentially corresponds to that shown in FIG. 3 and is also intended for relatively large oven constructions. The speed at which the fan operates corresponds to that according to the embodiment shown in FIG. 3. Here, however, the pre-atomization element 34 takes the form of a simple sphere 50 which features no encompassing ridge. Otherwise, this modified embodiment corresponds to that which has already been described with reference to FIG. 3.

Figure 5:
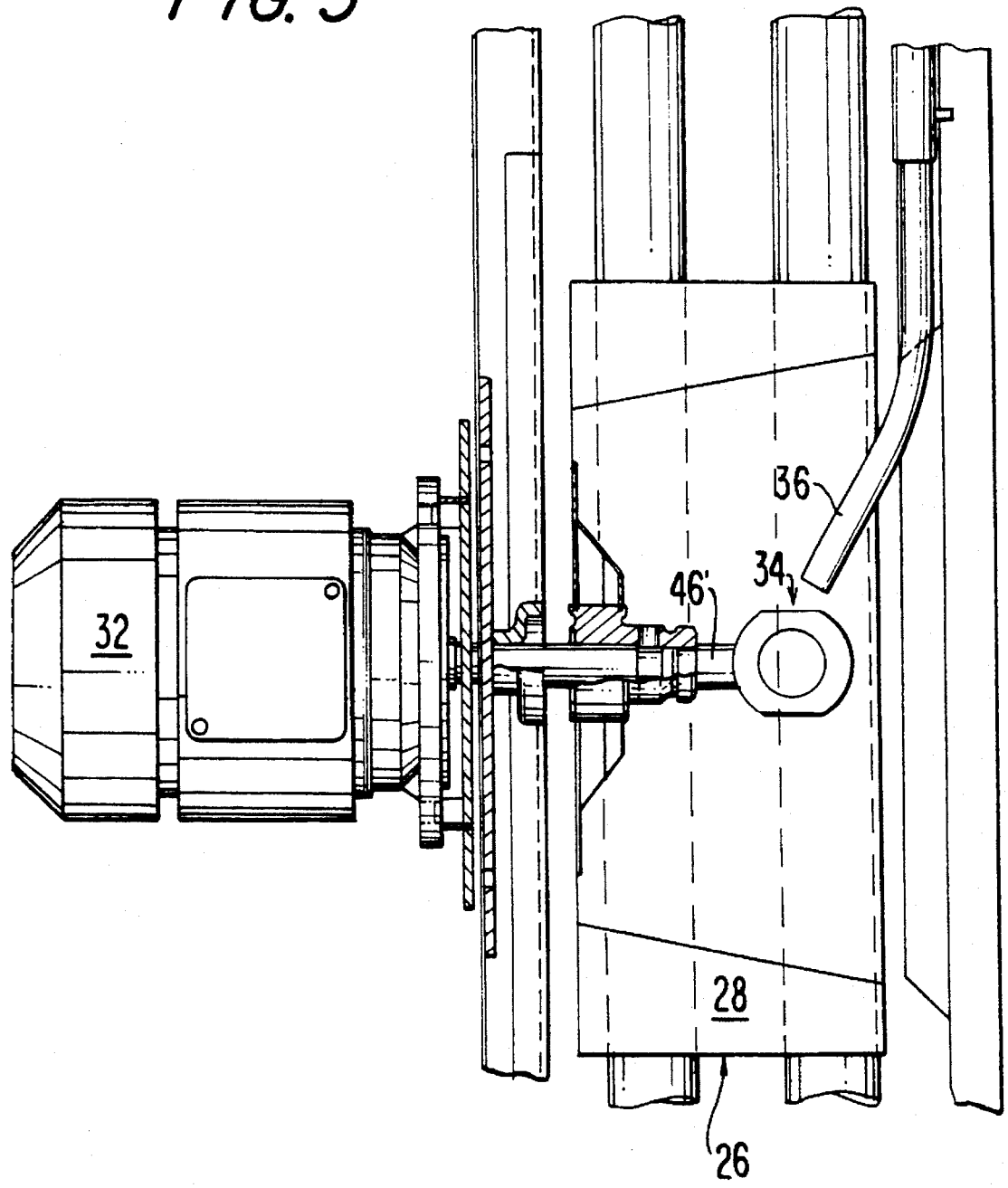
FIG. 5 is an enlarged, detailed view of a portion of the convection and steam oven illustrating an additional embodiment of the pre-atomization element.

The modified embodiment according to FIG. 5 corresponds to those according to FIGS. 3 and 4 and is also preferred for the large constructional variant of oven. Here, however, a sphere with flattened surfaces is used as the pre-atomization element 34.

Figure 6:
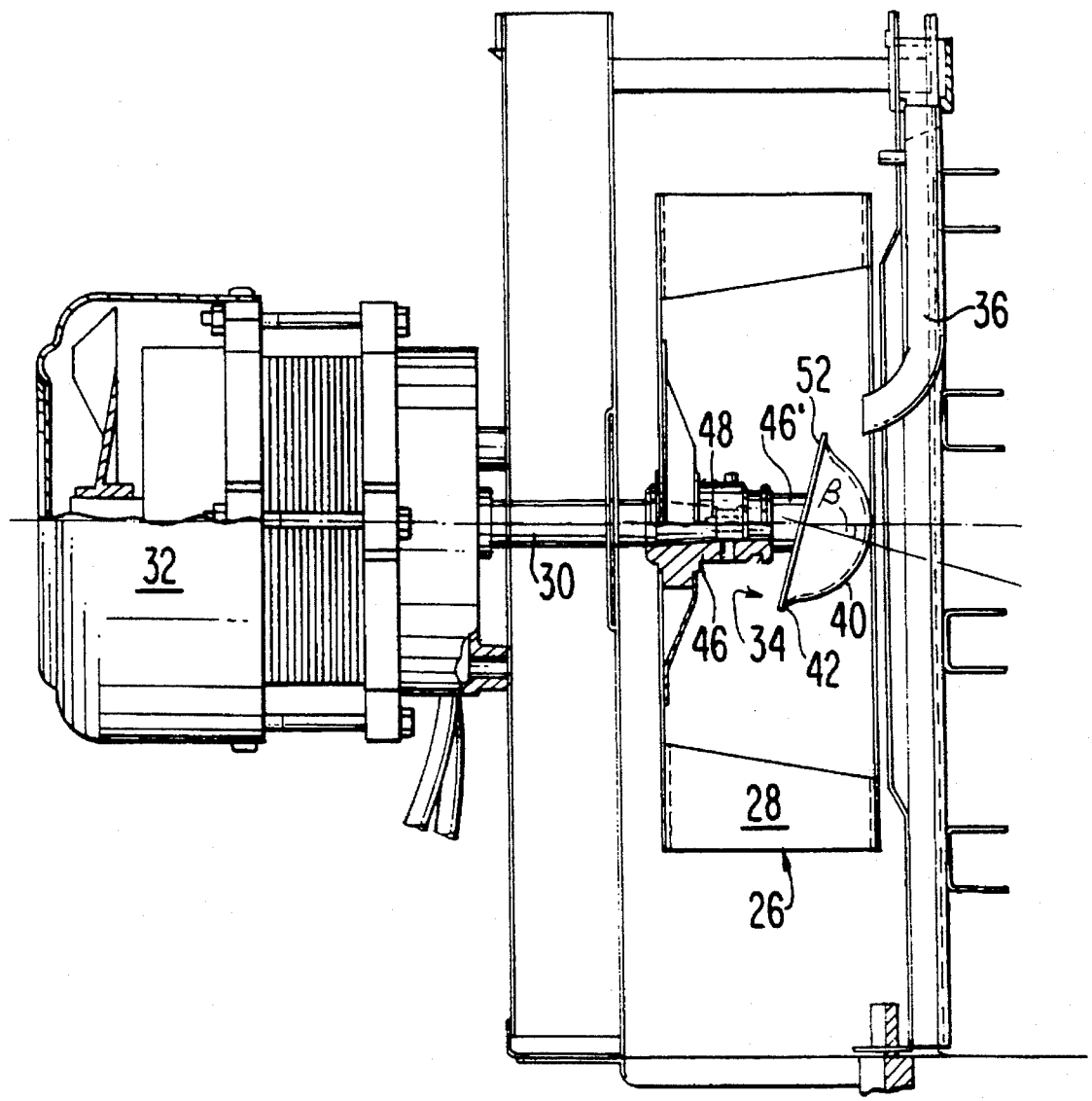
FIG. 6 is an enlarged, detailed view of a portion of the convection and steam oven illustrating still another embodiment of the pre-atomization element.
Figure 7:
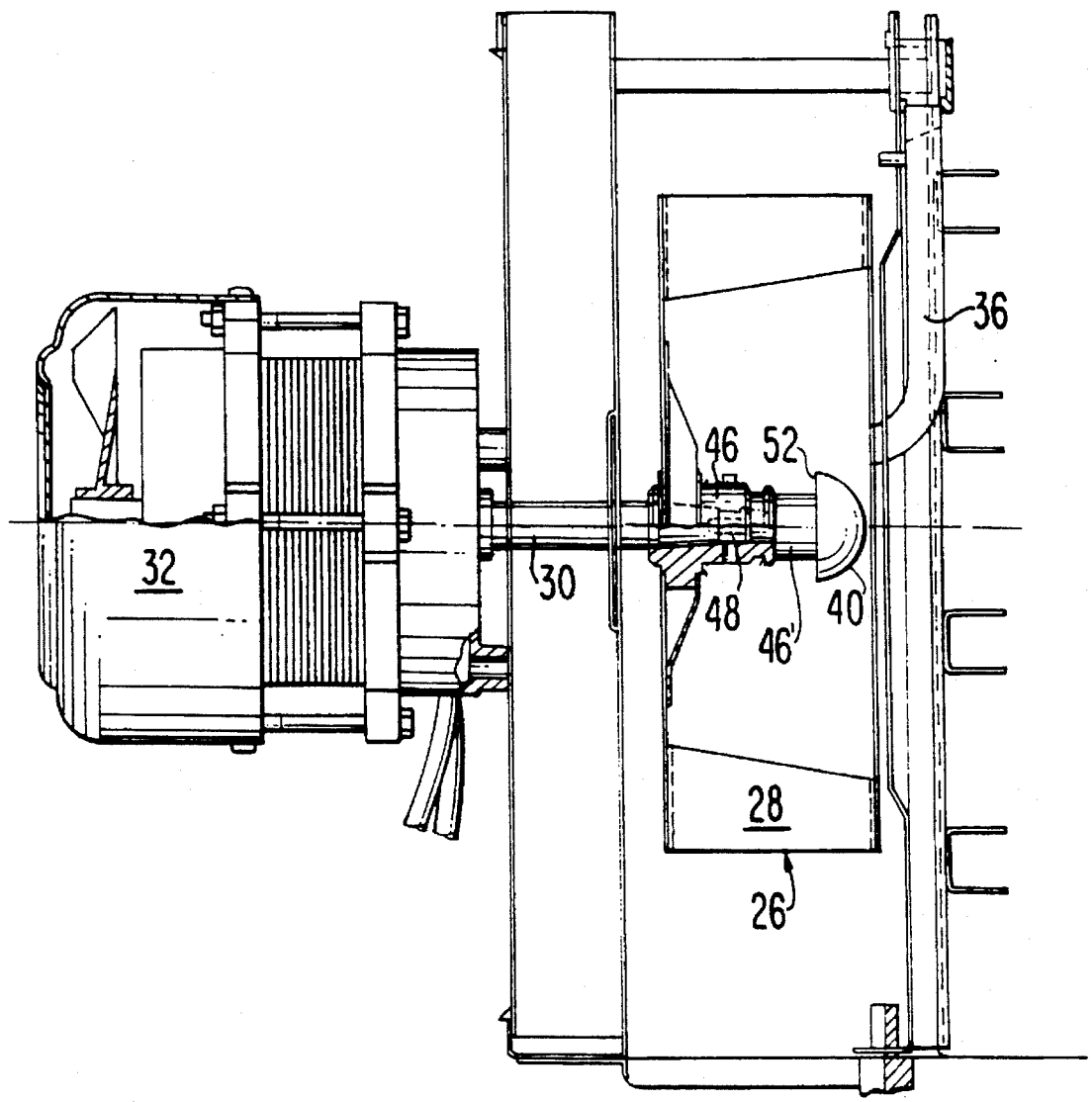
FIG. 7 is an enlarged, detailed view of a portion of the convection and steam oven illustrating yet another embodiment of the pre-atomization element.

In the embodiment depicted in FIG. 6, the pre-atomization element 34 takes the form of a semispherical body. This is formed from a semispherical shell 40 with a peripheral rim 42 to which a circular plate 52 is flush-connected by means of a sealing, material-bonding joint. The circular plate 52 is joined flush to the circumferential rim 42 so as to close and seal the semispherical shell 40 by virtue of uniting the materials of the two elements located at this plate 52 is a cylindrical attachment piece 46' which, by means of an integrally formed screw fastener 48, is screwed into the fan flange 46. As FIG. 6 shows, the semispherical body is tilted relative to the rotational axis. The line of symmetry of the semispherical body in this case forms an angle β of 15° with the rotational axis. The water pipe 36 ends above the pre-atomization element 34 as shown in FIG. 6. The embodiment according to FIG. 7 extensively corresponds to the embodiment described with the aid of FIG. 6. Here, however, there is no rim provided at the semispherical shell 40, and the axis of symmetry of the semispherical shell 40 coincides with the rotational axis. Otherwise, the embodiment according to FIG. 7 corresponds to that according to FIG. 6.

Figure 8:
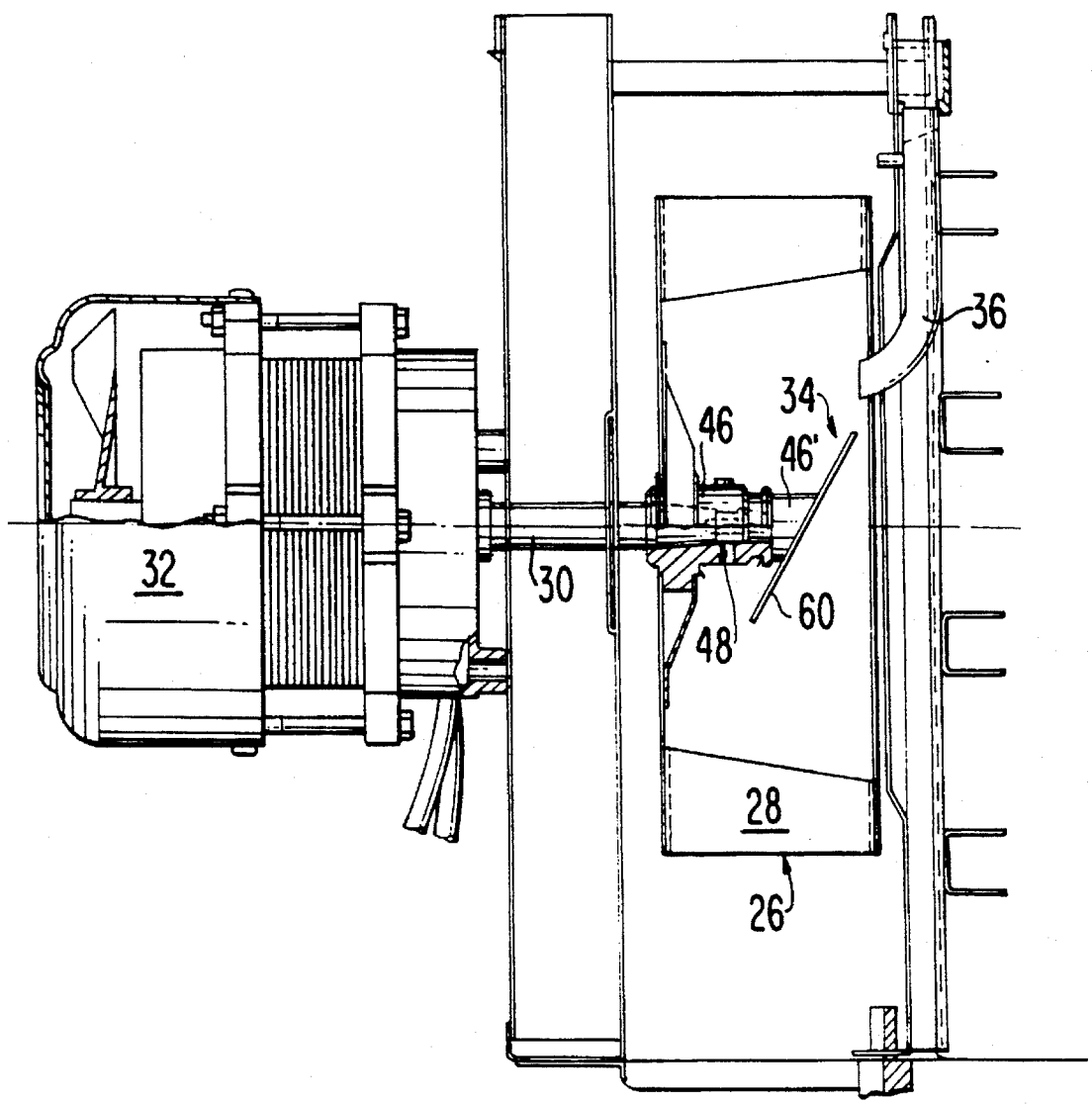
FIG. 8 is an enlarged, detailed view of a portion of the convection and steam oven illustrating yet a further embodiment of the pre-atomization element.

A further modified embodiment of the atomization device 34 is depicted in FIG. 8. There, provided at a cylindrical attachment piece 46' is a circular plate 60 arranged at a diagonal angle relative to the rotational axis. The water supply pipe 36 ends above the outer circumference of the rotating plate 60 as shown in FIG. 9.

FIGS. 9 to 12 show further alternatives for embodiments of a convection or steam oven according to the invention. As shown in the case of the preceding embodiments, the convection and steam oven comprises an oven chamber in which shelves or grids are slid and guided in the conventional manner on sliding rails. A partition separates an auxiliary chamber from the oven chamber. This auxiliary chamber is in communication with the oven chamber via peripheral slots and a central opening. In the auxiliary chamber is arranged a radial-action fan which, in FIGS. 9 to 12, is designated 26. This features fan blades 28 arranged around its circumference. The fan 26 is flanged onto a hub 30 which is driven by a rotor 32. Also arranged on the fan shaft is a pre-atomization element 34, adjacent to which is in the direction of the rotational axis ends the outlet opening of a pipe into which water to be evaporated is introduced. Arranged around the fan 26 are heating coils 38, not detailed in the drawings, which may, for example, be gas-heated or electrically heated. The oven may be operated as a convection oven in which air is streamed over the heating coils by the radial-action fan 26, causing the air to be heated. The heated air passes through the gap running around the partition into the oven chamber. In the area of the opening, the air is sucked from the oven chamber by the fan and deflected in the direction of the fan blades 28.

In the steam oven mode, water is additionally directed from the pipe 36 onto the rotating pre-atomization element 34 where it is dispersed in the form of fine droplets which are distributed across the depth of the fan 26. These pre-atomized droplets are entrained by the air streams deflected towards the fan blades 28, and impinge on the fan blades 28 where they are dispersed a second time and thus finally atomized. The water particles thus finally atomized are streamed past the heating elements, not detailed here, where they are transformed into the vapour phase. The steam is uniformly distributed by the air stream around oven chamber. The fact that the oven chamber is maintained at a gauge pressure of 3 to 8 mbar is particularly advantageous for steam distribution in the embodiment shown here. FIGS. 9 to 12 now show different embodiments for the pre-atomization element.

Figure 9:
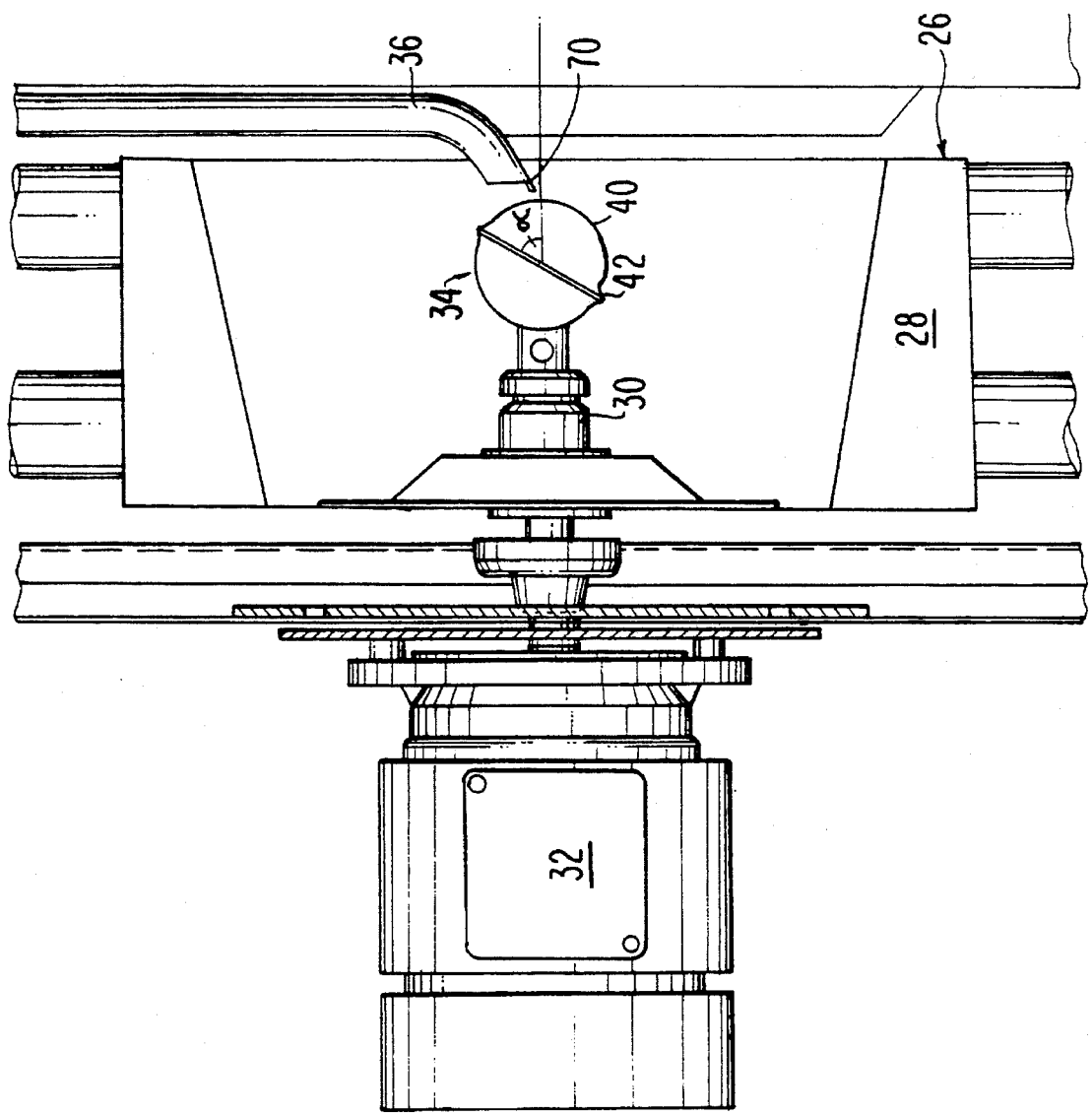
FIG. 9 is an enlarged, detailed view of a portion of an alternative embodiment of the convection and steam oven of the present invention.
Figure 10:
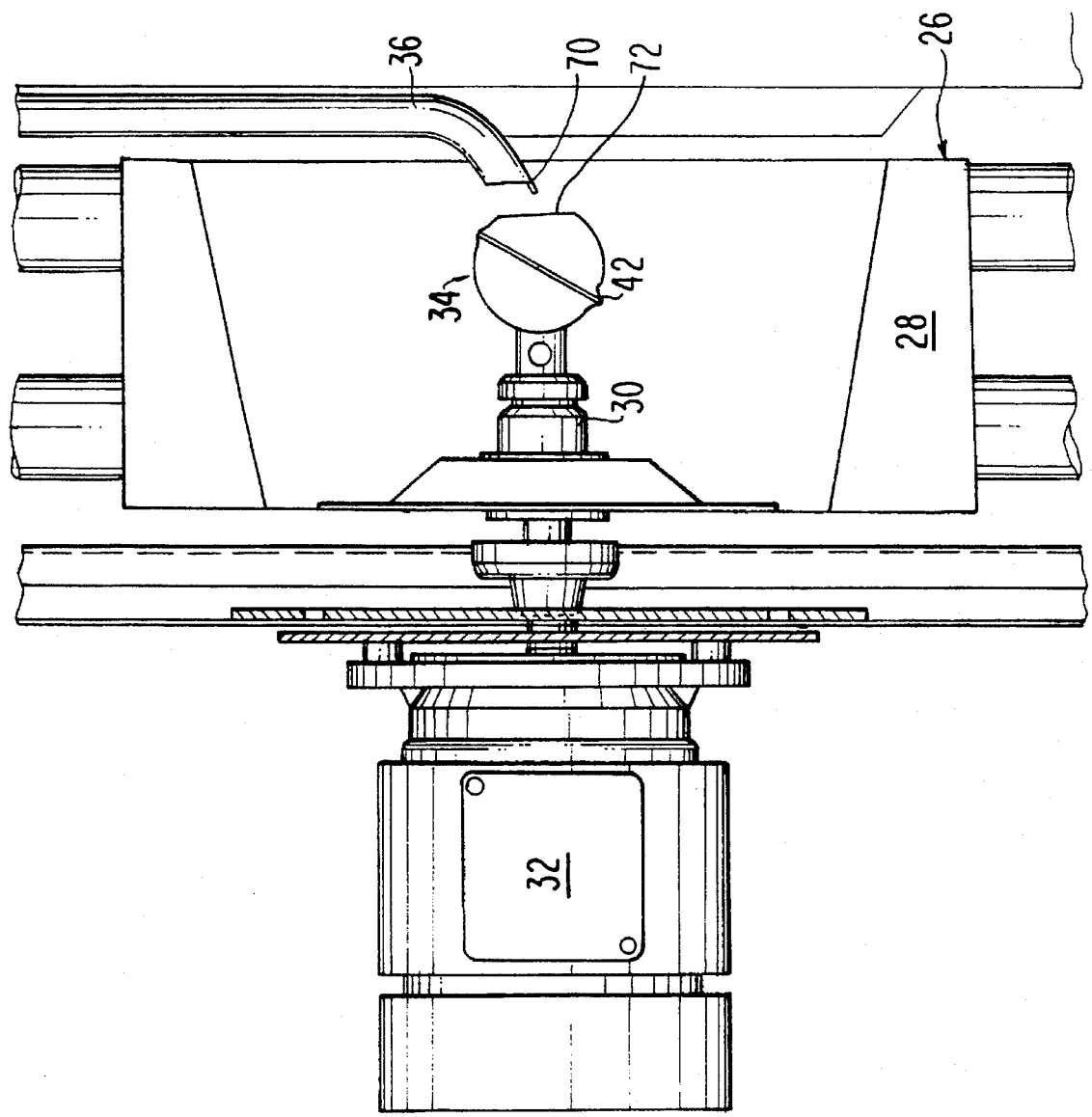
FIG. 10 is an enlarged, detailed view of a portion of the convection and steam oven, illustrating one more embodiment of the pre-atomization element.

In FIG. 9, a pre-atomization element 34 is mounted on the fan shaft 30 driven by the motor 32, said pre-atomization element 34 comprising two semispherical shells 40 each of which is bounded by a circumferential rim 42. The two semispherical shells are connected by a material-bonding joint along the mating rims 42. Along these integrally joined rims is formed a ridge which encompasses the surface of the sphere, said ridge intersecting the rotational axis of the sphere as indicated in FIG. 10 at an angle α which in this embodiment is approx. 60°. Thus a pre-atomization element is formed here in the shape of a sphere at the surface of which is arranged an encompassing ridge. The outlet opening of the pipe 36 is arranged adjacent to the sphere in the direction of the rotational axis as shown in FIG. 1. Located at the end of the outlet opening of the pipe aligned to the rotational axis of the fan 26 is a rod 70. The free end of the rod 70 extends approximately up to the rotational axis of the fan 26. Via this rod, the water droplets emerging from the outlet opening of the pipe 36 are guided towards the pre-atomization element 34. They are also entrained towards the pre-atomization element by the axial flow of the incoming air.

The embodiment according to FIG. 10 extensively corresponds to that according to FIG. 1 so that the individual features here do not require repetition. Unlike in the case of the embodiment according to FIG. 1, however, the pre-atomization element 34 features a flat 72 so that, essentially, it has the form of a sphere with a flat on one side. The flat 72 is located such that it faces the outlet opening of the pipe 36.

Figure 11A:
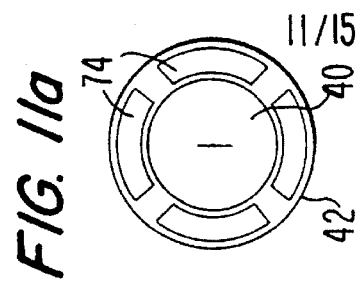
FIG. 11a is a view in the direction of arrow A in FIG. 11.
Figure 11:
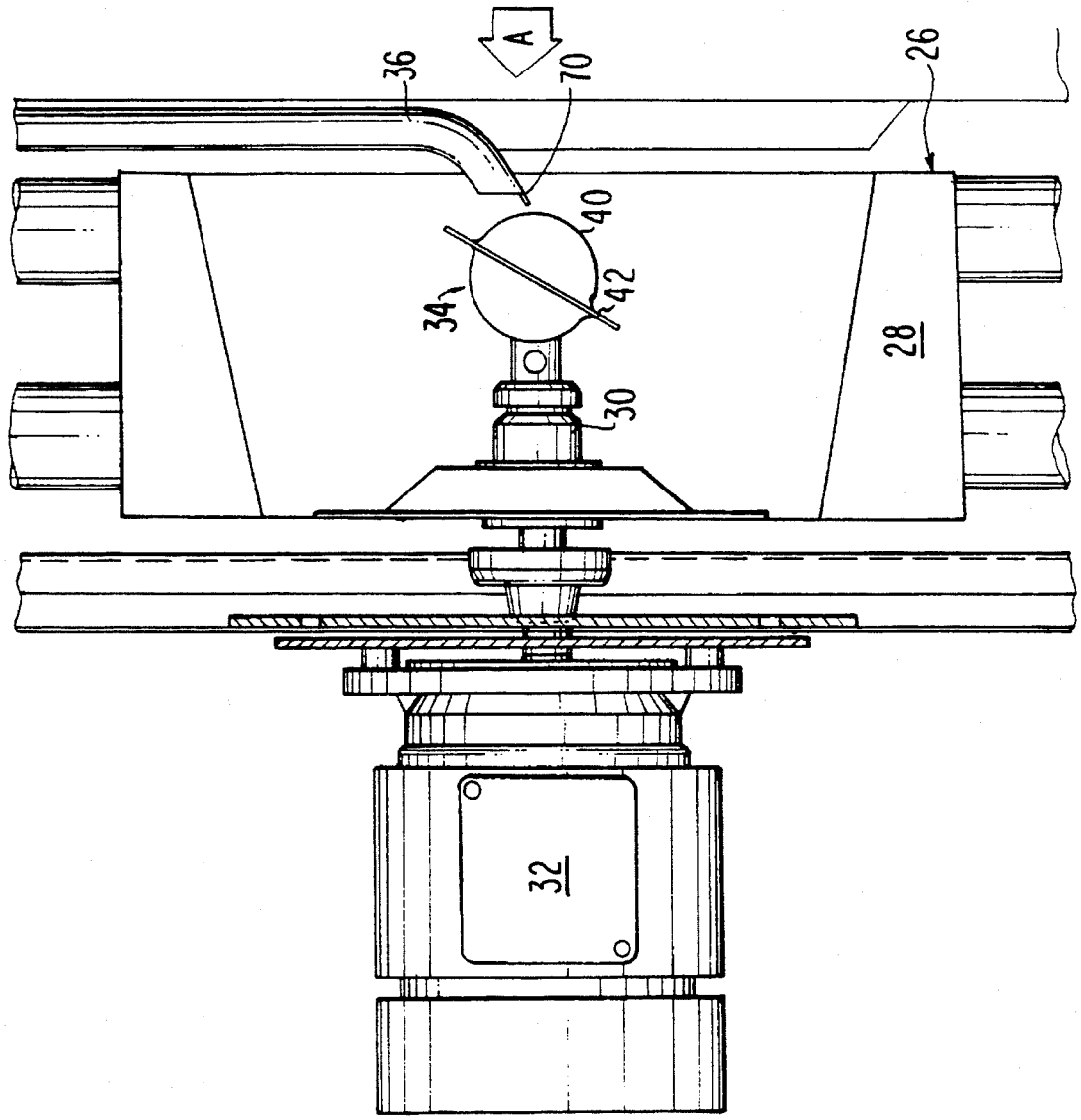
FIG. 11 is an enlarged, detailed view of a portion of the convection and steam oven illustrating still a further embodiment of the pre-atomization element.

FIG. 11 and 11a show a further modification of the pre-atomization element. Here the relatively wide ridge 42 encompassing the sphere features openings 74 around the circular ring by which it is formed. These result in a further improvement in the atomization process.

Figure 12:
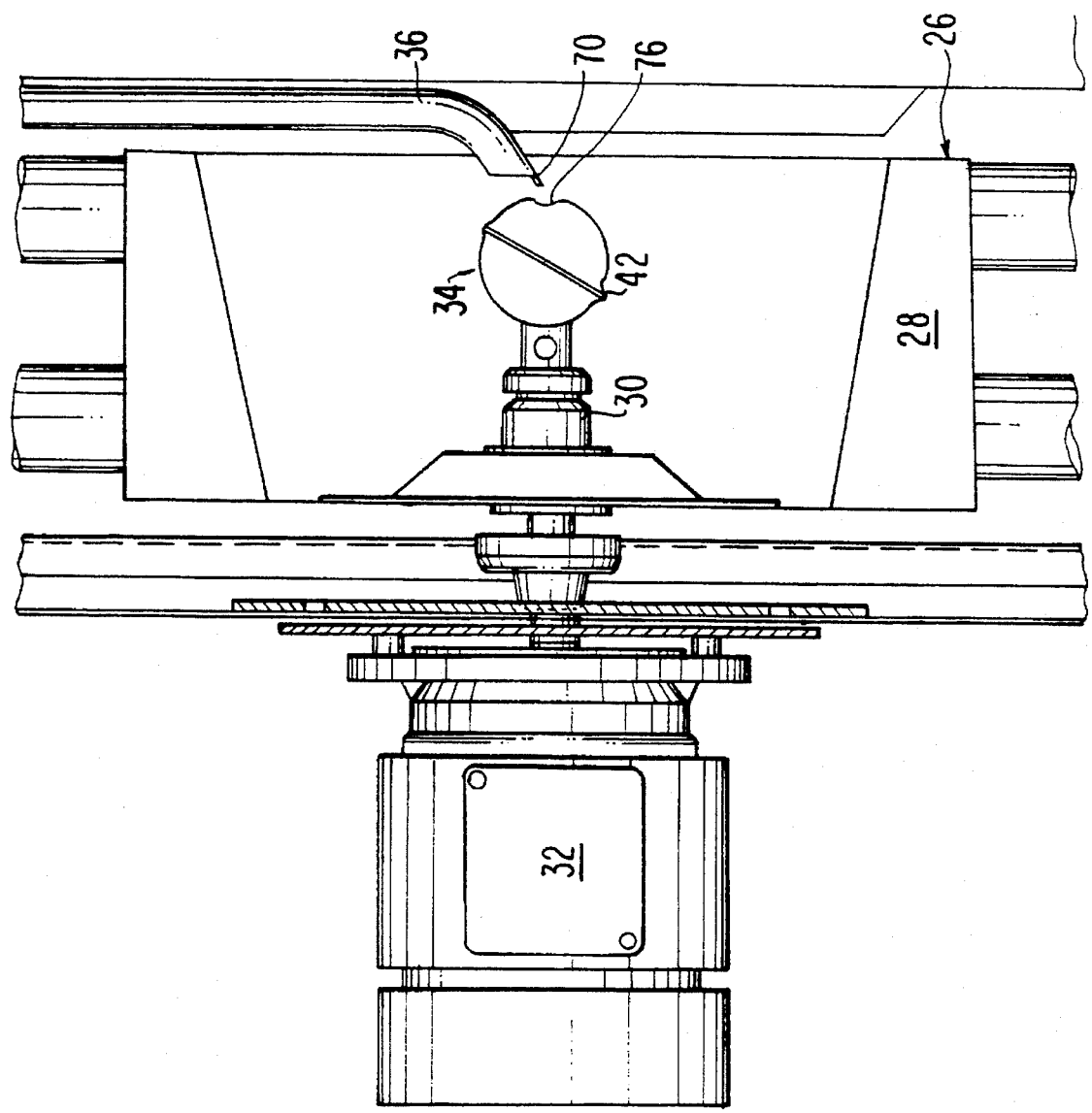
FIG. 12 is an enlarged, detailed view of a portion of the convection and steam oven illustrating even a further embodiment of the pre-atomization element.

Finally, FIG. 12 shows another modification of the embodiment according to FIG. 9 which entails the spherical pre-atomization element 34 featuring a recess 76 which is aligned in the direction of the rotational axis towards the interior of the sphere, with the rod 70 extending to within this recess.

Figure 13:
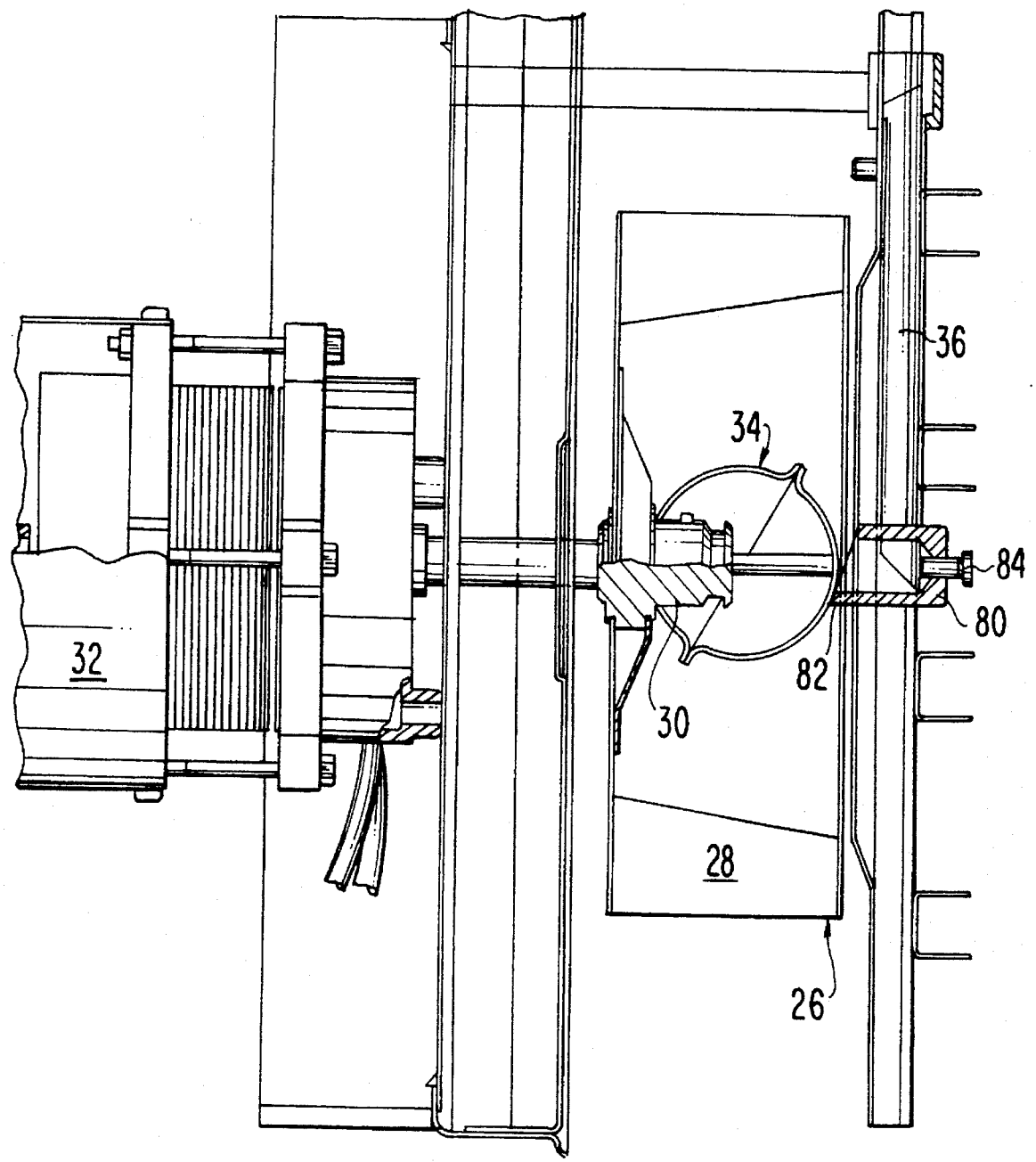
FIG. 13 is an enlarged, detailed view of a portion of an additional embodiment of the convection and steam oven of the present invention.

According to the embodiment shown in FIG. 13, the pre-atomization element 34 takes the form of the embodiment according to FIG. 1. In this further embodiment, however, the pipe 36 is modified. As depicted in FIG. 13, the pipe is brought down parallel to the walls forming the oven chamber to approximately the level of the line of symmetry of the pre-atomization element 34 designed as a sphere. The bevelled tip of the pipe 36 ends in a cup 80. The cup 80 has a bevelled rim 82 which points towards the pre-atomization element 34. Part of the area of the rim 82 can, as shown in FIG. 13, be in contact with the surface of the pre-atomization element 34. The cup of rubber 80 may be connected to the pipe 36 by means of a clamping screw fastener 84. This arrangement ensures that the water flowing in through the pipe 36 is brought into contact with the pre-atomization element via the cavity of the cup. Following forced contact with the pre-atomization element 34 the water is centrifuged away from the surface of the pre-atomization element 34, and as a result undergoes immediate pre-atomization.

Figure 14:
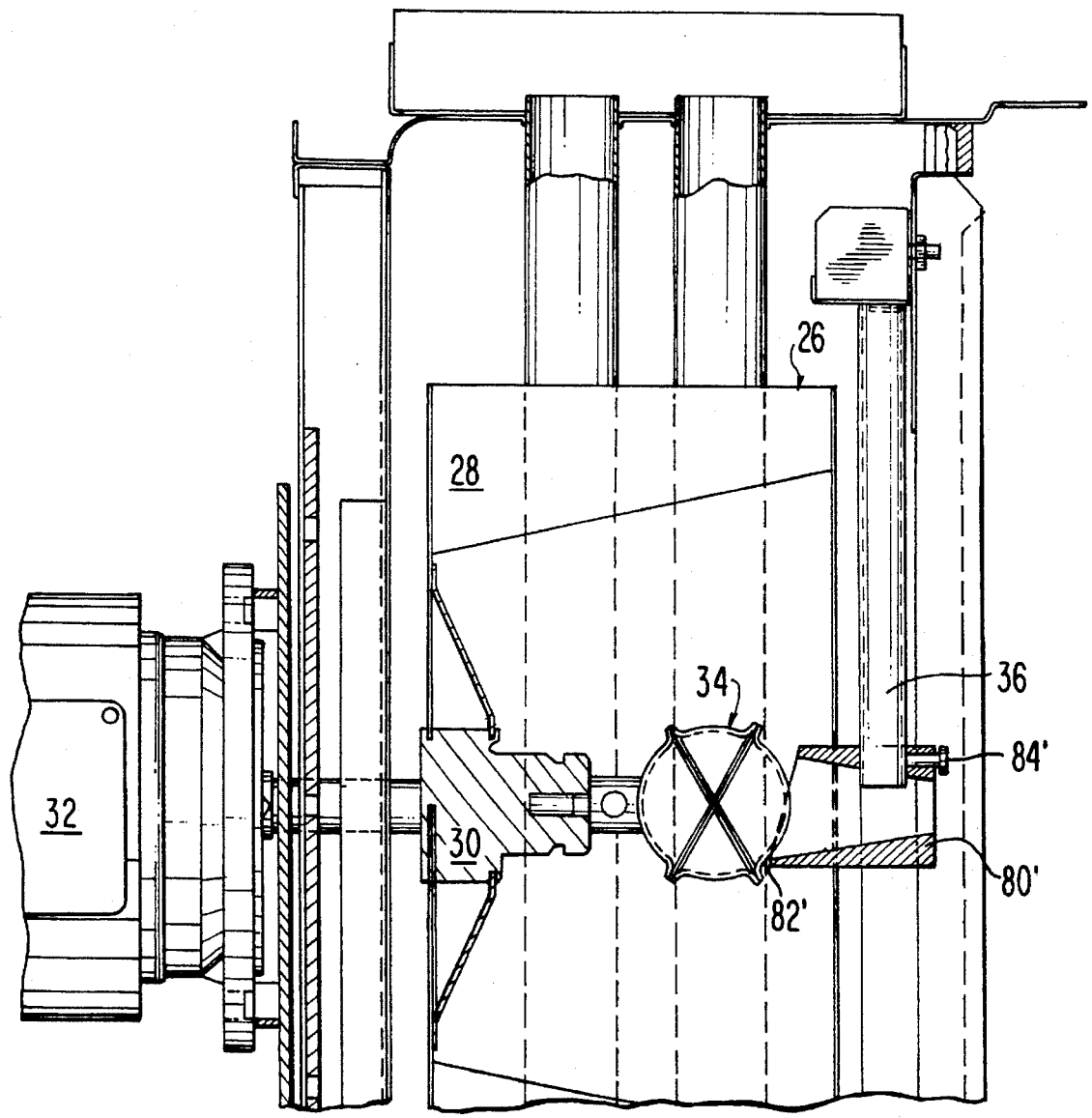
FIG. 14 is an enlarged, detailed view of a portion of a further embodiment of the convection and steam oven of the present invention.

FIG. 14 shows a modified form of a cup which more closely resembles a section of pipe 80'. The interior of the section of pipe 80' is shaped like a funnel, the direction of expansion of which is towards the pre-atomization element 34, so ensuring the flow of water to the pre-atomization element 34. The water is also additionally entrained by the air sucked through the section of pipe 80' as a result of the draft effect generated by the fan 28. This section of pipe is also connected to the supply pipe 36 by means of a clamping screw fastener 84'. The section of pipe 80' in this case also consists of rubber.

Figure 15:
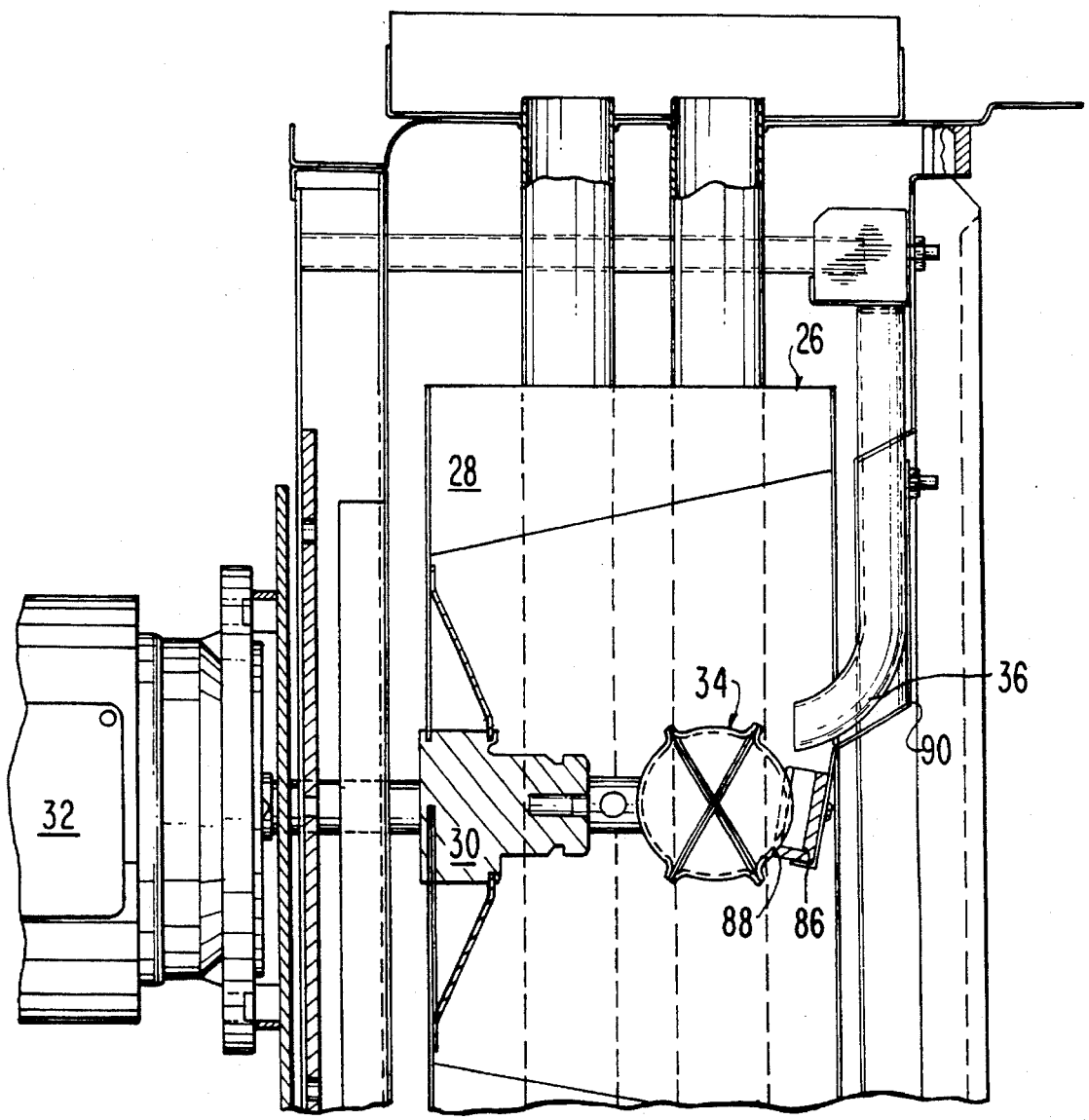
FIG. 15 is an enlarged, detailed view of a portion of one more embodiment of the convection and steam oven of the present invention.

FIG. 15 shows an embodiment in which the arrangement of the pipe 36 again corresponds to that depicted in FIG. 1. In this case, however, arranged below the outlet opening of the pipe 36 is a trough-shaped element 86 of rubber which is in contact at one edge 88 with the surface of the pre-atomization element. The trough-shaped element 86 is fastened to the pipe 36 by a mounting plate 90. The water emerging from the outlet opening of the pipe 36 drips into the trough-shaped element 86 and is thus forced into contact by this trough-shaped element 86 with the pre-atomization element 34, as illustrated in FIG. 15.

We claim:

1. Convection and steam oven for food, comprising
   an oven chamber,
   an auxiliary chamber partitioned off from the oven chamber,
   a motor-driven, radial-action fan arranged in the auxiliary chamber and comprising a hub,
   several heating elements arranged to surround the fan, and
   a pre-atomization element mounted upon the hub of the fan to rotate therewith,
   wherein said pre-atomization element is formed as a separate element apart from the fan hub and with a substantially convex surface.

2. The oven of claim 1, additionally comprising
   a pipe arranged to supply water to said pre-atomization element.

3. The oven of claim 2 wherein said pre-atomization element is substantially in the shape of a sphere.

4. The oven of claim 3, wherein said pre-atomization element additionally comprises a ridge substantially encompassing the sphere and arranged thereon to intersect a rotational axis of said sphere at an angle which is greater than about 0° and less than about 90°.

5. The oven of claim 3, wherein the pipe comprises an outlet opening arranged adjacent to said sphere in a rotational direction thereof and axially directed toward said sphere.

6. The oven of claim 3, wherein said sphere is composed of two substantially semispherical shells assembled together, each said substantially semispherical shell being bounded by a circumferential rim, and
   said two substantially semispherical shells being joined together along said mating rims thereof by at least one of an integrating material bond and positive locking arrangement.

7. The oven of claim 6, wherein said substantially semispherical shells each comprise respective openings,
   one opening on one of said substantially semispherical shells being arranged to fit upon a shaft end of the fan hub, and additionally comprising
   a screw fastener arranged to be inserted through the opening on the other of said substantially semispherical shells for mounting said sphere upon the fan hub.

8. The oven of claim 3, wherein said surface of said sphere is partially flattened.

9. The oven of claim 3, wherein said sphere is flattened along one side thereof, with said flattened portion positiond to face an outlet opening of the pipe.

10. The oven of claim 3, wherein said sphere comprises a recess aligned in a direction of a rotational axis thereof and extending towards an interior thereof, and additionally comprising a rod positioned upon an outlet opening of the pipe and arranged to extend into said recess.

11. The oven of claim 3, wherein the pipe comprises an outlet opening positioned to lie above said sphere, and additionally comprising
    a collection trough arranged below the outlet opening of the pipe and in an area of an axis of symmetry of said pre-atomization element, said collection trough comprising a bottom rim arranged to end substantially adjacent to said pre-atomization element.

12. The oven of claim 2, wherein the pipe comprises an outlet opening arranged to be directed toward a rotational axis of the fan, and additionally comprising
    a member constituted by a rod, reed or an additional pipe located at the outlet opening thereof.

13. The oven of claim 12, wherein said member is formed to be elastic.

14. The oven of claim 13, wherein said member comprises rubber.

15. The oven of claim 12, wherein said member is formed of metal.

16. The oven of claim 12, wherein said member comprises a free end thereof positioned to extend approximately to the rotational axis of the fan.

17. The oven of claim 2, wherein the pipe comprises an end arranged to terminate approximately at a level of a rotational axis of the fan, and additionally comprising
    a cup positioned at the pipe end and arranged to open towards said pre-atomization element.

18. The oven of claim 17, wherein said cup is formed from rubber or synthetic material.

19. The oven of claim 17, wherein said cup comprises a rim at an open end thereof which is bevelled and with a portion of said rim arranged directly adjacent to said pre-atomization element.

20. The oven of claim 2, wherein the pipe comprises an end arranged to terminate approximately at a level of the rotational axis of the fan, and additionally comprising
    a pipe section attached to the pipe and being open at both ends thereof.

21. The oven of claim 1, wherein said pre-atomization element is formed in the shape of a substantially semispherical body.

22. The oven of claim 21, wherein said substantially semispherical body is mounted upon the fan hub such that a line of symmetry of said substantially semispherical body is arranged to substantially coincide with a rotational axis thereof.

23. The oven of claim 21, wherein said substantially semispherical body is mounted upon the fan hub such that a line of symmetry of said substantially semispherical body is set at an angle relative to a rotational axis thereof.

24. The oven of claim 21, wherein said substantially semispherical body comprises
    a substantially semispherical shell having a circumferential rim and a circular plate joined flush to said circumferential rim to close and seal said substantially semispherical shell.

25. The oven of claim 1, wherein said pre-atomization element is formed and arranged upon the fan hub such that limescale deposits forming upon said pre-atomization element do not lead to clogging and functional impairment of the oven, but rather build up tipon said convex surface leading to additional irregularities at said convex surface which further improves pre-atomization effect.

26. Convection and steam oven for food, comprising
    an oven chamber,
    an auxiliary chamber partitioned off from the oven chamber,
    a motor-driven, radial-action fan arranged in the auxiliary chamber and comprising a hub, several heating elements arranged to surround the fan, a pre-atomization element mounted upon a hub of the fan to rotate therewith, and a pipe arranged to supply water to said pre-atomization element, wherein said pre-atomization element is formed as a plate set at a diagonal angle to a rotational axis of the fan, with the pipe arranged to terminate above said plate.

27. The oven of claim 26, wherein said plate is substantially circular.

28. The oven of claim 26, wherein said pre-atomization element is formed and arranged upon the fan hub such that limescale deposits forming upon said pre-atomization element do not lead to clogging and functional impairment of the oven, but rather build up upon said plate leading to additional irregularities at said plate further improving pre-atomization effect, and a uniform distribution of water particles across the depth of the fan is achieved.

* * * * *